US012646246B2

(12) United States Patent
Kim

(10) Patent No.: US 12,646,246 B2
(45) Date of Patent: Jun. 2, 2026

(54) METHOD AND APPARATUS FOR RECONSTRUCTING A THREE-DIMENSIONAL SHAPE BASED ON MULTIPLE LIGHT SOURCES

(71) Applicant: Electronics and Telecommunications Research Institute, Daejeon (KR)

(72) Inventor: Joon Soo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 154 days.

(21) Appl. No.: 18/443,936

(22) Filed: Feb. 16, 2024

(65) Prior Publication Data

US 2024/0282049 A1 Aug. 22, 2024

(30) Foreign Application Priority Data

Feb. 16, 2023 (KR) ........................ 10-2023-0020963
Jul. 24, 2023 (KR) ........................ 10-2023-0096253

(51) Int. Cl.
*G06T 15/50* (2011.01)
*G06T 7/11* (2017.01)
*G06T 7/73* (2017.01)

(52) U.S. Cl.
CPC .............. *G06T 15/506* (2013.01); *G06T 7/11* (2017.01); *G06T 7/73* (2017.01); *G06T 2207/20081* (2013.01); *G06T 2207/20084* (2013.01)

(58) Field of Classification Search
CPC . G06T 15/506; G06T 7/11; G06T 7/73; G06T 2207/20081; G06T 2207/20084
See application file for complete search history.

(56) References Cited

U.S. PATENT DOCUMENTS

| | | | |
|---|---|---|---|
| 8,928,525 B2 | 1/2015 | Byun et al. | |
| 10,665,001 B2 | 5/2020 | Horstmeyer et al. | |
| 11,532,122 B2 | 12/2022 | Yoon et al. | |
| 11,687,031 B2 * | 6/2023 | Luo ..................... | G02B 21/367 |
| | | | 348/40 |
| 11,854,142 B2 * | 12/2023 | Park ....................... | G16H 50/50 |
| 2004/0183430 A1 * | 9/2004 | Takenaka ................ | H01J 29/06 |
| | | | 313/497 |

(Continued)

FOREIGN PATENT DOCUMENTS

| | | |
|---|---|---|
| KR | 10-1700621 B1 | 2/2017 |
| KR | 10-2021-0113053 A | 9/2021 |
| KR | 10-2023-0029070 A | 3/2023 |

*Primary Examiner* — Abderrahim Merouan

(74) *Attorney, Agent, or Firm* — NSIP Law

(57) ABSTRACT

A device, method, and system for restoring a 3D shape based on multiple light sources are disclosed. A method performed by a device may include obtaining a set of measured images of a specimen by photographing the specimen under different lighting conditions; defining a first three-dimensional grid within a 3D reconstruction area including all or part of the specimen; obtaining a first set of coordinate values for calculating a scattering potential value within a first 3D grid or a frequency grid region corresponding to the first 3D grid; and obtaining a 3D refractive index distribution of the specimen based on the output data obtained through an artificial neural network model, and the artificial neural network model is trained based on differences between the set of predicted images and the set of the measured images.

7 Claims, 7 Drawing Sheets

(56) References Cited

U.S. PATENT DOCUMENTS

| | | | |
|---|---|---|---|
| 2008/0221734 A1* | 9/2008 | Nagao | G06V 10/56 |
| | | | 706/20 |
| 2010/0149611 A1* | 6/2010 | Leister | G03H 1/2294 |
| | | | 345/426 |
| 2018/0247153 A1* | 8/2018 | Ganapati | G06F 18/285 |
| 2019/0056214 A1* | 2/2019 | Everett | A61B 3/152 |
| 2021/0191096 A1* | 6/2021 | Watanabe | G02B 21/0032 |
| 2021/0191316 A1 | 6/2021 | Luo et al. | |
| 2022/0252395 A1* | 8/2022 | Hench | G01B 15/00 |
| 2022/0404712 A1* | 12/2022 | Zhang | G03F 7/70516 |
| 2023/0011759 A1* | 1/2023 | Lu | G06T 5/20 |
| 2023/0059661 A1* | 2/2023 | Park | G06T 15/205 |
| 2023/0124680 A1* | 4/2023 | Zhang | G06F 7/4806 |
| | | | 341/115 |
| 2024/0282049 A1* | 8/2024 | Kim | G06T 7/11 |

* cited by examiner

FIG.1

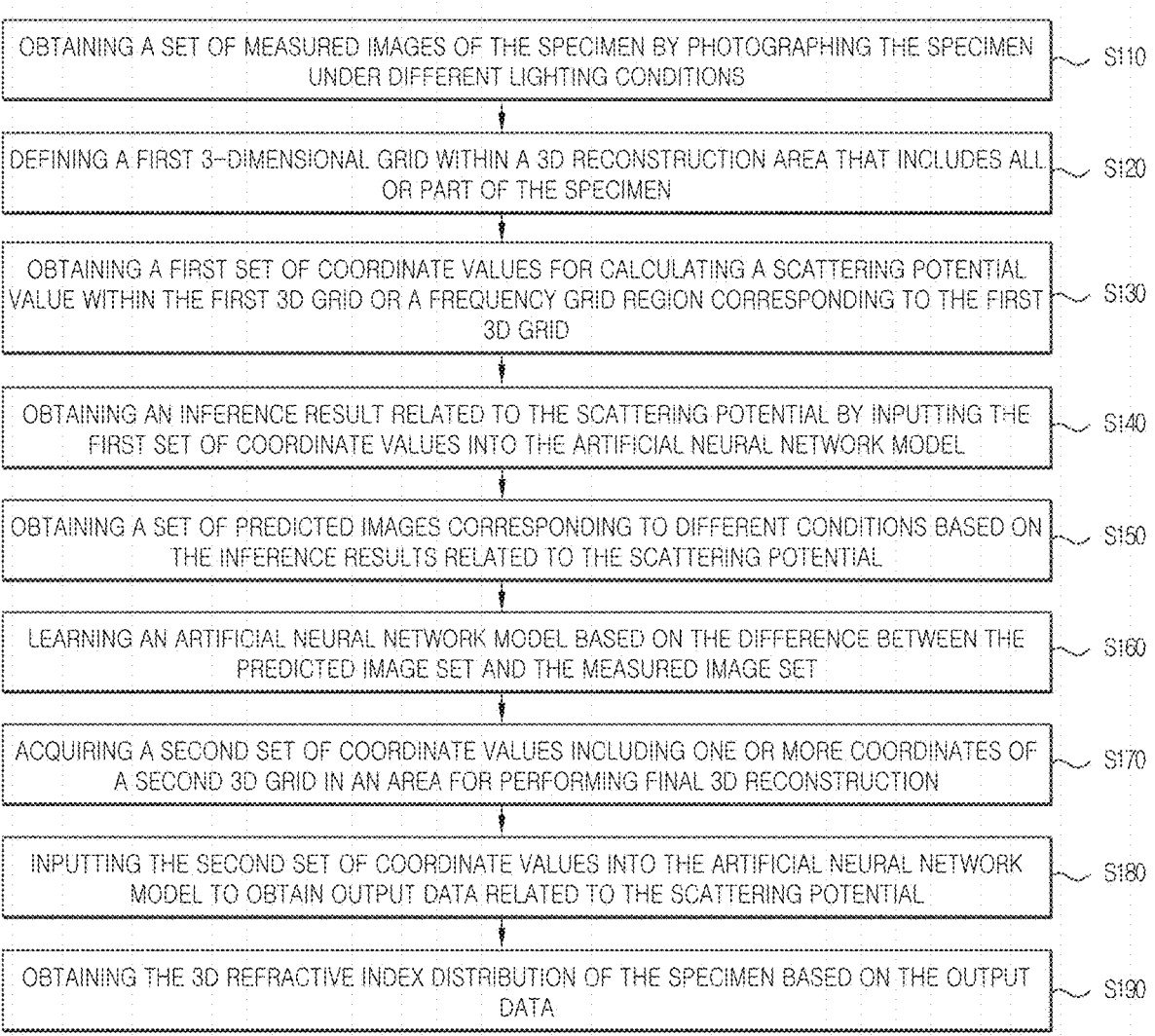

OBTAINING A SET OF MEASURED IMAGES OF THE SPECIMEN BY PHOTOGRAPHING THE SPECIMEN UNDER DIFFERENT LIGHTING CONDITIONS    ~ S110

DEFINING A FIRST 3-DIMENSIONAL GRID WITHIN A 3D RECONSTRUCTION AREA THAT INCLUDES ALL OR PART OF THE SPECIMEN    ~ S120

OBTAINING A FIRST SET OF COORDINATE VALUES FOR CALCULATING A SCATTERING POTENTIAL VALUE WITHIN THE FIRST 3D GRID OR A FREQUENCY GRID REGION CORRESPONDING TO THE FIRST 3D GRID    ~ S130

OBTAINING AN INFERENCE RESULT RELATED TO THE SCATTERING POTENTIAL BY INPUTTING THE FIRST SET OF COORDINATE VALUES INTO THE ARTIFICIAL NEURAL NETWORK MODEL    ~ S140

OBTAINING A SET OF PREDICTED IMAGES CORRESPONDING TO DIFFERENT CONDITIONS BASED ON THE INFERENCE RESULTS RELATED TO THE SCATTERING POTENTIAL    ~ S150

LEARNING AN ARTIFICIAL NEURAL NETWORK MODEL BASED ON THE DIFFERENCE BETWEEN THE PREDICTED IMAGE SET AND THE MEASURED IMAGE SET    ~ S160

ACQUIRING A SECOND SET OF COORDINATE VALUES INCLUDING ONE OR MORE COORDINATES OF A SECOND 3D GRID IN AN AREA FOR PERFORMING FINAL 3D RECONSTRUCTION    ~ S170

INPUTTING THE SECOND SET OF COORDINATE VALUES INTO THE ARTIFICIAL NEURAL NETWORK MODEL TO OBTAIN OUTPUT DATA RELATED TO THE SCATTERING POTENTIAL    ~ S180

OBTAINING THE 3D REFRACTIVE INDEX DISTRIBUTION OF THE SPECIMEN BASED ON THE OUTPUT DATA    ~ S190

Figure 5:
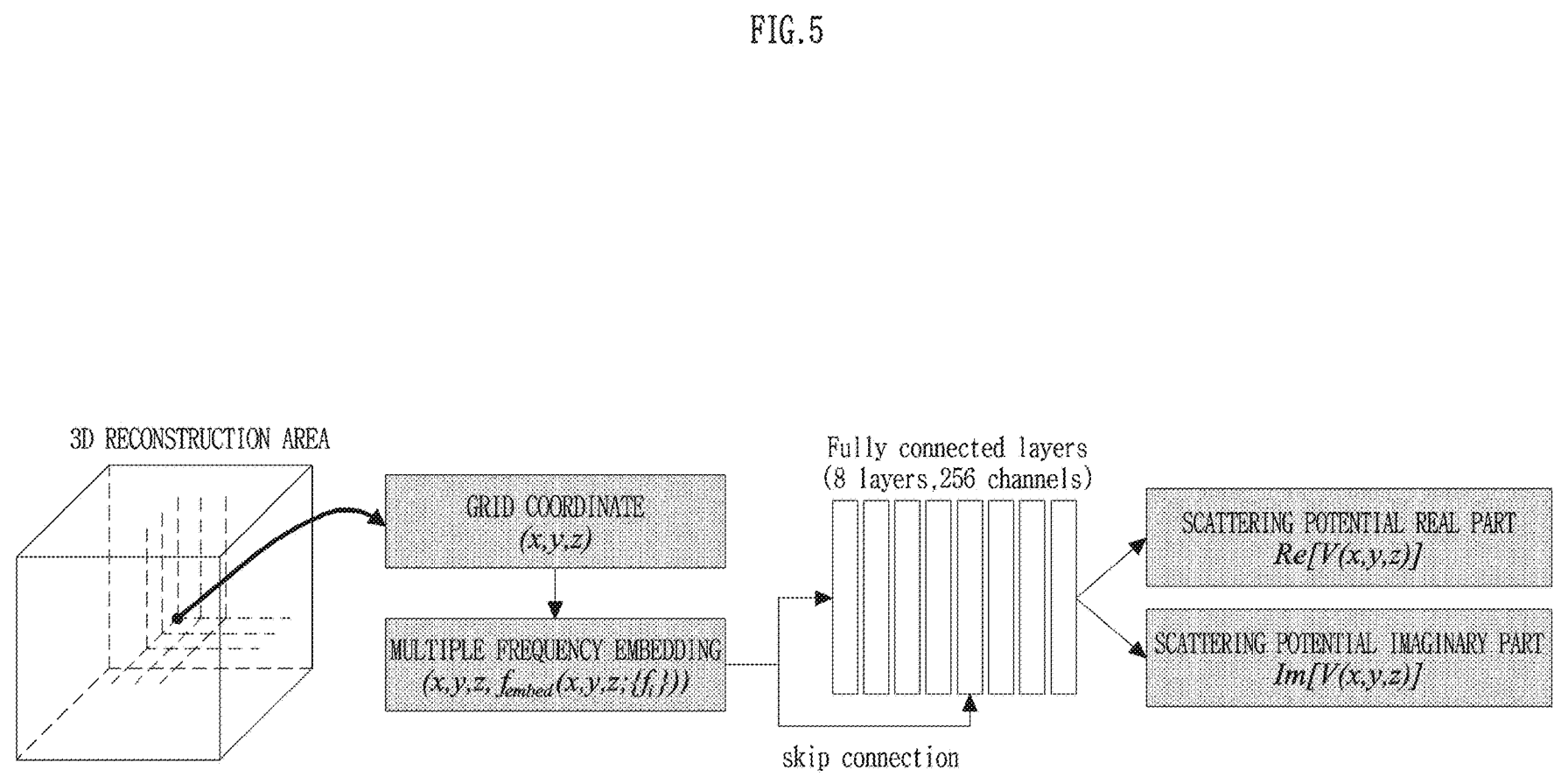

3D RECONSTRUCTION AREA

GRID COORDINATE $(x,y,z)$

MULTIPLE FREQUENCY EMBEDDING $(x,y,z,f_{embed}(x,y,z,\{f_i\}))$

Fully connected layers (8 layers,256 channels)

skip connection

SCATTERING POTENTIAL REAL PART $Re[V(x,y,z)]$

SCATTERING POTENTIAL IMAGINARY PART $Im[V(x,y,z)]$

METHOD AND APPARATUS FOR RECONSTRUCTING A THREE-DIMENSIONAL SHAPE BASED ON MULTIPLE LIGHT SOURCES

CROSS-REFERENCE TO RELATED APPLICATIONS

This application claims the benefit of earlier filing date and right of priority to Korean Application No. 10-2023-0020963, filed on Feb. 16, 2023 and Korean Application No. 10-2023-0096253, filed on Jul. 24, 2023, the contents of which are all hereby incorporated by reference herein in their entirety.

TECHNICAL FIELD

The present disclosure relates to the field of 3D shape reconstruction technology, and more specifically, to a method, device, and system for reconstructing a 3D image of a sample based on a plurality of 2D images acquired based on multiple light sources.

BACKGROUND

Fourier ptychography technology is a technology developed to circumvent the space-bandwidth limitations of imaging systems.

When trying to secure a large area in a general imaging system, loss of resolution may occur, and conversely, to obtain high resolution, the observation area must be narrowed. To circumvent this trade-off relationship, Fourier ptychography technology uses a collection of images taken while changing the direction of light incidence.

Due to various illumination incident angles, low-angle scattered light to high-angle scattered light may be sequentially incident into the aperture of a limited imaging system. Because of this, it is possible to obtain high-resolution images of a wide area by combining the frequency spectrum of the captured images. When Fourier ptychography technology is applied, the phase is reconstructed based on multiple shooting information in the frequency domain, so the explicit complex light wave reconstruction process can be omitted.

SUMMARY

The technical problem of the present disclosure is to provide a method and device for reconstructing a three-dimensional shape based on multiple light sources.

The technical problem of the present disclosure is to provide a method and device for reconstructing a three-dimensional image of a sample based on a plurality of two-dimensional images obtained based on multiple light sources.

The technical problem of the present disclosure is to provide a method and device for reconstructing the three-dimensional shape of an object captured using a collection of intensity images taken while turning on a plurality of lights in a predetermined manner.

The technical problems to be achieved in the present disclosure are not limited to the technical tasks mentioned above, and other technical problems not mentioned will be clearly understood by those skilled in the art from the description below.

A method performed by a device to reconstruct a three-dimensional (3D) shape based on multiple light sources, the method may include obtaining a set of measured images of a specimen by photographing the specimen under different lighting conditions; defining a first three-dimensional grid within a 3D reconstruction area including all or part of the specimen; obtaining a first set of coordinate values for calculating a scattering potential value within a first 3D grid or a frequency grid region corresponding to the first 3D grid; inputting the first set of coordinate values into an artificial neural network model to obtain an inference result related to a scattered potential; obtaining a set of predicted images corresponding to the different lighting conditions based on the inference result related to the scattering potential; training the artificial neural network model based on differences between the set of predicted images and the set of the measured images; obtaining a second set of coordinate values including at least one coordinate of a second 3D grid in an area for performing final 3D reconstruction; inputting the second set of coordinate values into the artificial neural network model to obtain output data related to scattering potential; and obtaining a 3D refractive index distribution of the specimen based on the output data.

In addition, the inference result may include scattering potential data or scattering potential spectrum data obtained by applying a three-dimensional Fourier transform to the scattering potential data.

In addition, the acquiring the set of predicted image sets may include applying a two-dimensional inverse Fourier transform to the scattering potential spectrum data and then adding background light.

In addition, the multiple light sources may include a plurality of light emitting diodes (LEDs) configuring the different lighting conditions, the set of measured images may be obtained through light emitted through each of the plurality of LEDs, and an angle of incidence of the each of the plurality of LEDs may be different from each other.

In addition, the training the artificial neural network model may include updating a weight of the artificial neural network model through gradient descent using a loss function calculated based on difference between the set of predicted images and the set of measured images.

In addition, based on a domain type being determined to be frequency domain, the artificial neural network model may be trained to output scattering potential spectrum data, and based on the domain type being determined to be a spatial domain, the artificial neural network model may be trained to output scattering potential data.

In addition, the domain type may be determined based on a scattering characteristic of a sample corresponding to the set of measured images.

In addition, the domain type may be determined based on the scattering characteristics of the sample corresponding to the measured image set.

In addition, the output data includes scattering special spectrum data or scattering potential data, and the step of acquiring the 3D shape may include acquiring the 3D shape through the 3D refractive index distribution of the specimen.

According to various embodiments of the present disclosure, a device that reconstructs 3-dimensional (3D) shape based on multiple light sources may include at least one memory; and at least one processor, and the at least one processor may be configured to: obtain a set of measured images of a specimen by photographing the specimen under different lighting conditions; define a first three-dimensional grid within a 3D reconstruction area including all or part of the specimen; obtain a first set of coordinate values for calculating a scattering potential value within a first 3D grid or a frequency grid region corresponding to the first 3D grid;

input the first set of coordinate values into an artificial neural network model to obtain an inference result related to a scattered potential; obtain a set of predicted images corresponding to the different lighting conditions based on the inference result related to the scattering potential; train the artificial neural network model based on differences between the set of predicted images and the set of the measured images; obtain a second set of coordinate values including at least one coordinate of a second 3D grid in an area for performing final 3D reconstruction; input the second set of coordinate values into the artificial neural network model to obtain output data related to scattering potential; and obtain a 3D refractive index distribution of the specimen based on the output data.

In addition, the at least one processor may be configured to obtain the set of prediction images by applying a two-dimensional inverse Fourier transform to the scattering potential spectrum data and then adding background light.

In addition, the at least one processor may be set to align a grid corresponding to the prediction image set and a grid corresponding to the actual measurement image set.

In addition, the at least one processor may be configured to update the weights of the artificial neural network model through gradient descent using a loss function calculated based on the difference between the predicted image set and the measured image set.

And, the output data includes scattering special spectrum data or scattering potential data, and the one or more processors may be set to obtain the 3D shape through the 3D refractive index distribution of the specimen.

A system for reconstructing a 3-dimensional (3D) shape may include a device for restoring 3D shape; and multiple light source system that obtains measured image data through multiple light sources; the device may be configured to: obtain a set of measured images of a specimen by photographing the specimen under different lighting conditions; define a first three-dimensional grid within a 3D reconstruction area including all or part of the specimen; obtain a first set of coordinate values for calculating a scattering potential value within a first 3D grid or a frequency grid region corresponding to the first 3D grid; input the first set of coordinate values into an artificial neural network model to obtain an inference result related to a scattered potential; obtain a set of predicted images corresponding to the different lighting conditions based on the inference result related to the scattering potential; train the artificial neural network model based on differences between the set of predicted images and the set of the measured images; obtain a second set of coordinate values including at least one coordinate of a second 3D grid in an area for performing final 3D reconstruction; input the second set of coordinate values into the artificial neural network model to obtain output data related to scattering potential; and obtain a 3D refractive index distribution of the specimen based on the output data.

In one embodiment of the present disclosure, one or more non-transitory computer readable media storing one or more instructions, the one or more instructions being executed by one or more processors, the device for restoring a three-dimensional (3D) shape is configured to obtain a set of measured images of a specimen by photographing the specimen under different lighting conditions; define a first three-dimensional grid within a 3D reconstruction area including all or part of the specimen; obtain a first set of coordinate values for calculating a scattering potential value within a first 3D grid or a frequency grid region corresponding to the first 3D grid; input the first set of coordinate values into an artificial neural network model to obtain an inference result related to a scattered potential; obtain a set of predicted images corresponding to the different lighting conditions based on the inference result related to the scattering potential; train the artificial neural network model based on differences between the set of predicted images and the set of the measured images; obtain a second set of coordinate values including at least one coordinate of a second 3D grid in an area for performing final 3D reconstruction; input the second set of coordinate values into the artificial neural network model to obtain output data related to scattering potential; and obtain a 3D refractive index distribution of the specimen based on the output data.

The features briefly summarized above with respect to the disclosure are merely exemplary aspects of the detailed description of the disclosure that follows, and do not limit the scope of the disclosure.

According to various embodiments of the present disclosure, a method and device for reconstructing a three-dimensional shape based on multiple light sources can be provided.

According to various embodiments of the present disclosure, a method and device for reconstructing a 3D image of a sample based on a plurality of 2D images acquired based on multiple light sources may be provided.

By various embodiments of the present disclosure, a method and apparatus may be provided for restoring the three-dimensional shape of an object captured using a collection of intensity images taken while turning on a plurality of lights in a predetermined manner.

The effects obtainable in the present disclosure are not limited to the effects mentioned above, and other effects not mentioned will be clearly understood by those skilled in the art from the description below.

BRIEF DESCRIPTION OF THE DRAWINGS

FIG. 1 is a flowchart illustrating a method for reconstructing a three-dimensional shape based on multiple light sources performed by a device, according to an embodiment of the present disclosure.

Figure 2A:
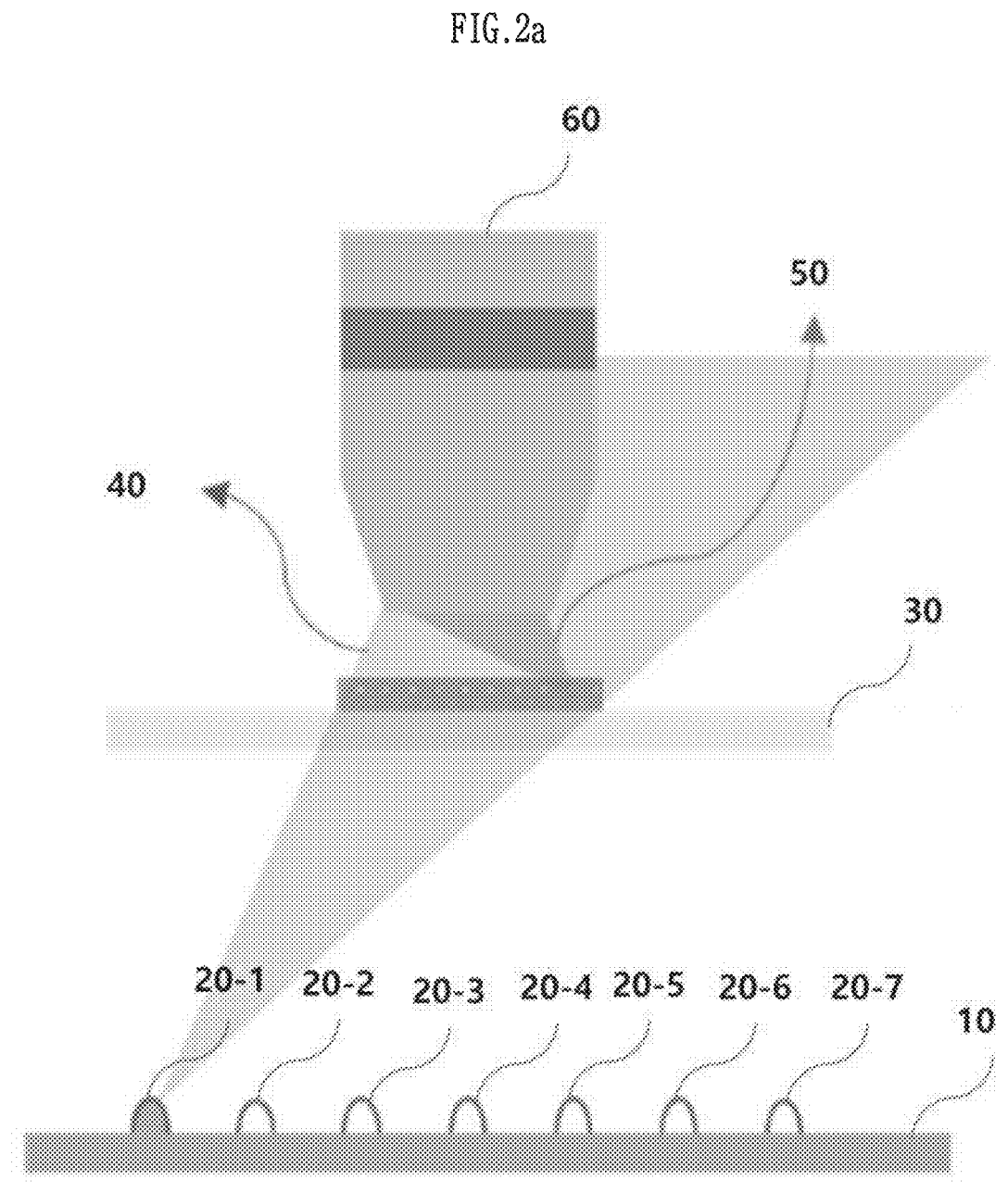

FIGS. 2A and 2B are diagrams for describing a method of obtaining an image of a specimen using a multiple light source array according to an embodiment of the present disclosure.

FIGS. 4 and 5 are flowcharts for describing a method of learning an implicit representation model to output a scattering potential, according to an embodiment of the present disclosure.

DETAILED DESCRIPTION

Figure 2B:
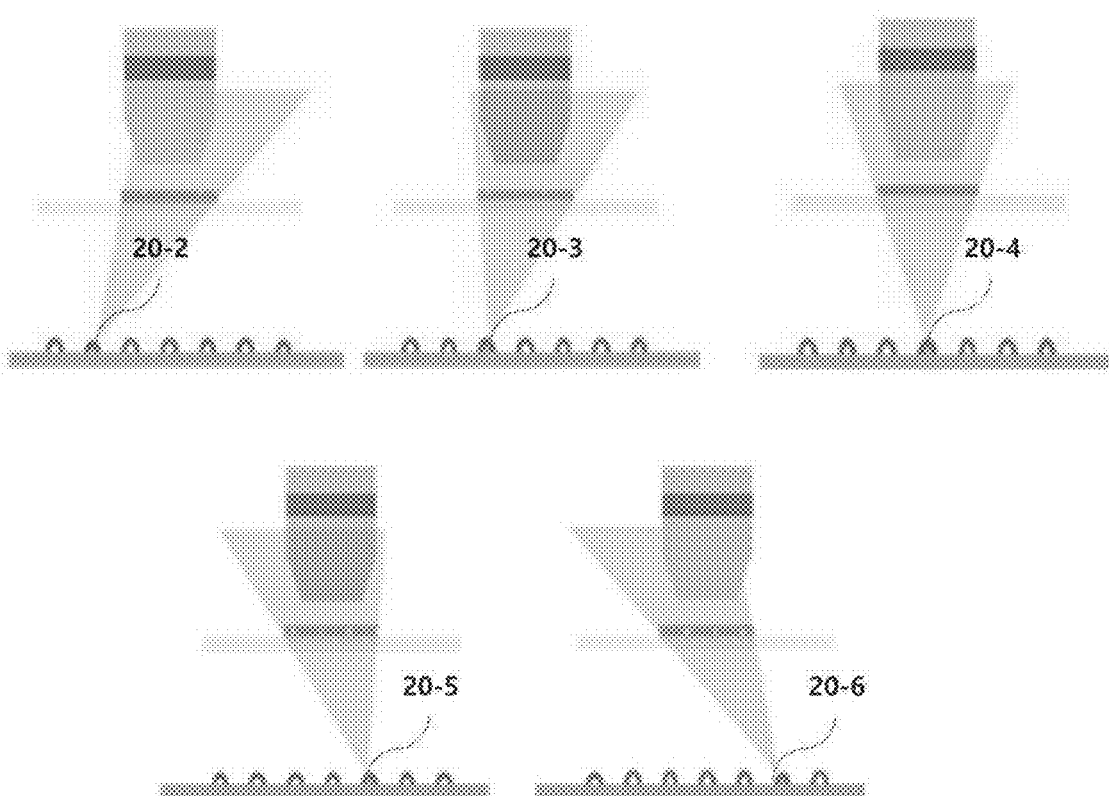

Since the present disclosure can make various changes and have various embodiments, specific embodiments are illustrated in the drawings and described in detail in the detailed description. However, this is not intended to limit the present disclosure to specific embodiments, and should be understood to include all modifications, equivalents, and substitutes included in the idea and scope of the present disclosure. Similar reference numbers in the drawings indicate the same or similar function throughout the various aspects. The shapes and sizes of elements in the drawings may be exaggerated for clarity. Detailed description of exemplary embodiments to be described later refers to the accompanying drawings, which illustrate specific embodiments by way of example. These embodiments are described in sufficient detail to enable those skilled in the art to practice the embodiments. It should be understood that the various embodiments are different, but need not be mutually exclusive. For example, specific shapes, structures, and characteristics described herein may be implemented in another embodiment without departing from the idea and scope of the present disclosure in connection with one embodiment. Additionally, it should be understood that the location or arrangement of individual components within each disclosed embodiment may be changed without departing from the spirit and scope of the embodiment. Accordingly, the detailed description set forth below is not to be taken in a limiting sense, and the scope of the exemplary embodiments, if properly described, is limited only by the appended claims, along with all equivalents as claimed by those claims.

In the present disclosure, terms such as first and second may be used to describe various components, but the components should not be limited by the terms. These terms are only used for the purpose of distinguishing one component from another. For example, a first element may be termed a second element, and similarly, a second element may be termed a first element, without departing from the scope of the present disclosure. The term and/or includes a combination of a plurality of related recited items or any one of a plurality of related recited items.

When an element of the present disclosure is referred to as being "connected" or "connected" to another element, it may be directly connected or connected to the other element, but it should be understood that other components may exist in the middle. On the other hand, when an element is referred to as "directly connected" or "directly connected" to another element, it should be understood that no other element exists in the middle.

Components appearing in the embodiments of the present disclosure are shown independently to represent different characteristic functions, and do not mean that each component is composed of separate hardware or a single software component. That is, each component is listed and included as each component for convenience of description, and at least two components of each component are combined to form one component, or one component can be divided into a plurality of components to perform functions. An integrated embodiment and a separate embodiment of each of these components are also included in the scope of the present disclosure unless departing from the essence of the present disclosure.

Terms used in the present disclosure are only used to describe specific embodiments, and are not intended to limit the present disclosure. Singular expressions include plural expressions unless the context clearly dictates otherwise. In the present disclosure, terms such as "comprise" or "have" are intended to designate that there are features, numbers, steps, operations, components, parts, or combinations thereof described in the specification, and it should be understood that this does not preclude the possibility of the presence or addition of one or more other features, numbers, steps, operations, components, parts, or combinations thereof. That is, the description of "including" a specific configuration in the present disclosure does not exclude configurations other than the corresponding configuration, and means that additional configurations may be included in the practice of the present disclosure or the scope of the technical spirit of the present disclosure.

Some of the components of the present disclosure may be optional components for improving performance rather than essential components that perform essential functions in the present disclosure. The present disclosure may be implemented including only components essential to implement the essence of the present disclosure, excluding components used for performance improvement, and a structure including only essential components excluding optional components used only for performance improvement is also included in the scope of the present disclosure.

Hereinafter, embodiments of the present disclosure will be described in detail with reference to the drawings. In describing the embodiments of this specification, if it is determined that a detailed description of a related known configuration or function may obscure the gist of the present specification, the detailed description will be omitted. The same reference numerals are used for the same components in the drawings, and redundant descriptions of the same components are omitted.

The system and/or method/device (hereinafter simply referred to as 'system') proposed in the present disclosure relates to a technology for reconstructing (or restoring) a three-dimensional shape based on multiple light sources.

The technology for reconstructing a three-dimensional shape based on multiple light sources according to the present disclosure may be based on at least one of optical diffraction tomography, three-dimensional Fourier ptychography, and an implicit representation model.

Here, tomography is a general term for a technology that measures the cross-sections of an object using waves that can pass through the inside of the object. Optical diffraction tomography refers to a technology that reconstructs (or restores) the three-dimensional shape of an object from the pattern in which light waves incident from various directions are scattered by the object.

Optical diffraction tomography is similar to X-ray tomography in that it restores the shape through the inverse Fourier transform of scattered light. However, unlike X-ray tomography, where reconstruction is performed on a plane basis, there is a difference between the two in that optical diffraction tomography performs three-dimensional reconstruction on a sphere shell basis according to the Fourier diffraction theorem.

In order to reconstruct the refractive index distribution on the spherical shell, measurement of the scattered light distribution with complex values is required, and this can be achieved through holographic light wave measurement.

3D Fourier ptychography is related to a method of reconstructing 3D refractive index distribution, such as optical diffraction tomography.

3D Fourier ptychography and optical diffraction tomography are similar to each other in that they estimate the refractive index distribution on a spherical shell from an image taken through light incident from a specific direction.

However, 3D Fourier ptychography differs from optical diffraction tomography in that it uses an iterative optimization-based phase restoration technique like 2D Fourier ptychography instead of explicit complex light wave measurement.

In the case of 3D Fourier typography, a much larger number of captured images are required for 3D reconstruction than in the case of 2D Fourier ptychography. However, when 3D Fourier typography is applied, 3D reconstruction can be achieved simply by densely arranging the light source array without a complicated phase measurement setup.

The implicit expression model may collectively refer to an artificial neural network model that may approximate a function that defines the object to be expressed. Neural radiance field (NeRF) exists as an example of an implicit expression.

NeRF is designed to approximate the RGBα distribution function, which can define spatial characteristics from a volume rendering perspective, with a multilayer perceptron model.

At this time, the multi-layer perceptron model that learns the RGBα distribution function from a collection of rendered image samples may be called an implicit expression model for space.

The implicit expression model may be applied to a variety of objects. For example, a video may be viewed as an RGB distribution function that depends on (x, y, t), and a multi-layer perceptron model that approximates that function may be used as an implicit representation of the video.

The implicit representation model may be used to learn high-quality 3D data representation from limited measurement images.

Hereinafter, a method for reconstructing the three-dimensional shape of a photographed object with high quality based on a collection of intensity images taken with multiple lights turned on in a predetermined manner is described.

FIG. 1 is a flowchart for describing a method of reconstructing (or restoring) a three-dimensional shape based on multiple light sources performed by a device, according to an embodiment of the present disclosure.

Here, the device may be implemented as a desktop, smart phone, server device, tablet PC, wearable device, as well as various types of electronic/computing devices.

The device may obtain a set of measured images (or ground truth image set) of the specimen by photographing the specimen under different lighting conditions (S110).

Here, the measured image (e.g., measured intensity image) may include images of a plurality of specimens taken under different lighting conditions by controlling each of a plurality of light emitting diodes (LEDs). Specifically, the actual measurement image (or ground truth image) may refer to a set of images obtained through a plurality of LEDs of a sample (or specimens) located in part or all of the 3D reconstruction area. Here, the angle of incidence of each of the plurality of LEDs may be different from each other.

The process of obtaining an actual image through a multiple light source system (e.g., a lighting device or/and a microscope, etc.) including a plurality of LEDs will be described in detail with reference to FIGS. 2 and 4.

Additionally or alternatively, an illumination device comprising a plurality of LEDs and/or a microscope may be a component of the device. As another example, a lighting device or/and a microscope including a plurality of LEDs may be connected to the device through a wireless/wired communication module.

That is, in describing the present disclosure, different lighting conditions may be determined according to control of a plurality of LEDs. The user may determine the lighting conditions when photographing the specimen by activating a specific LED among a plurality of LEDs.

The device may define a first 3-dimensional grid within a 3D reconstruction (or restoration) area that includes all or part of the specimen (S120). Then, the device may obtain a first set of coordinate values for calculating a scattering potential value within the first 3D grid or a frequency grid region corresponding to the first 3D grid (S130). The device may obtain an inference result related to the scattering potential by inputting the first set of coordinate values into the artificial neural network model (S140).

Here, the 3D reconstruction (or restoration) area may mean a specific area where the user wants to reconstruct (or restore)/create a 3D shape. The device may define/obtain a set of 3D coordinate values (e.g. {(x, y, z)}) (i.e., a first set of coordinate values) corresponding to the 3D reconstruction area, and input the obtained set of coordinate values into an artificial neural network model.

Here, the artificial neural network model may mean an implicit expression model that outputs data related to the scattering potential. The structure of the artificial neural network model may consist of a multi-layer perceptron, but is not limited thereto.

Here, the inference result related to the scattering potential may include i) 3D scattering potential data or ii) scattering potential spectrum data obtained by applying a 3D Fourier transform to the scattering potential data.

In other words, the artificial neural network model may be implemented as an implicit expression model that outputs scattering potential data or outputs scattering potential spectrum data.

The device may obtain a set of predicted images corresponding to different conditions based on the inference results related to the scattering potential (S150).

As an example, when the inference result is scattering potential data, the device may obtain scattering potential spectrum data by applying three-dimensional Fourier transform to the scattering potential data. The device may obtain predicted image data (e.g., predicted intensity image data) corresponding to different lighting conditions for the 3D restored area by applying a two-dimensional inverse Fourier transform to the scattering potential spectrum data and adding background light.

As another example, if the inference result is scattering potential spectrum data, the device may obtain predicted images corresponding to different lighting conditions for the 3D reconstruction area by applying a two-dimensional inverse Fourier transform to the inference result and then adding background light.

The device may learn an artificial neural network model based on the difference between the predicted image set and the measured image set (or ground truth image set) (S160).

The device may first align the grid corresponding to the predicted image set and the grid corresponding to the measured image set (or the ground truth image set). The device may update the weights of the artificial neural network model through gradient descent using a loss function (or loss function value) calculated based on the difference (i.e., error) between the predicted image set and the measured image set.

Additionally or alternatively, the device may train the artificial neural network model differently depending on the domain type. At this time, the domain type may be determined based on the scattering characteristics of the sample corresponding to the measured image data. As another example, the domain type may be selected by the user.

As an example, based on the domain type being determined as the frequency domain, the device may train an artificial neural network model to output scattering potential spectrum data. As another example, based on the domain type being determined as a spatial domain, the device may train an artificial neural network model to output scattering potential data.

The device may acquire a second set of coordinate values including one or more coordinates of a second 3D grid in an area for performing final 3D reconstruction (S170). The device may input the second set of coordinate values into the artificial neural network model to obtain output data related to the scattering potential (S180).

That is, operations corresponding to S110 to S160 refer to operations corresponding to the learning stage of the artificial neural network model, and operations corresponding to steps S170 and below refer to operations corresponding to the inference stage of the artificial neural network model.

The device may obtain the 3D refractive index distribution of the specimen based on the output data (S190).

Here, the output data may include scattering potential spectrum data or scattering potential data.

Specifically, the device may obtain a 3D refractive index distribution for the 3D reconstruction area through scattering potential spectrum data or scattering potential data. The device can acquire a 3D shape through 3D refractive index distribution.

FIGS. 2A and 2B are diagrams for describing a method of obtaining an image of a specimen using a multiple light source array according to an embodiment of the present disclosure. That is, FIGS. 2A and 2B show examples of multiple light source-based imaging systems.

As shown in FIG. 2A, a plurality of light sources (20-1, 20-2, 20-3, 20-4, 20-5, 20-6, 20-7) may be arranged in various shapes on the light source substrate 10. For example, a plurality of light sources 20-1, 20-2, 20-3, 20-4, 20-5, 20-6, and 20-7 may be arranged at regular intervals on the light source substrate 10.

Each light source may be used for the purpose of illuminating the specimen 30 (i.e., a small piece or sample of the object to be analyzed) (e.g., for the purpose of emitting background light 40 or/and for generating scattered light 50, etc.). The imaging optical system 60 may acquire each image through background light 40 or/and scattered light 50.

Here, the light source may include, but is not limited to, an LED (light emitting diode), and may be implemented as various types of light sources. Also, FIG. 2a shows a case where there are 7 light sources, but is not limited thereto. That is, the number of light sources may be determined by various values.

In order to properly operate/apply Fourier ptychography-based phase reconstruction (or restoration), a certain level of illumination light coherence (i.e., the property of causing waves caused by illumination light to show interference) may be required. Accordingly, measures such as adjusting the size of the light source may be necessary.

The shape of the light source array must have a shape that allows illumination light to enter from various angles, and may be implemented as a planar array or a dome-shaped array. For example, as shown in FIG. 2B, each of the plurality of light sources (20-1, 20-2, 20-3, 20-4, 20-5, 20-6, 20-7) may be arranged so that illumination light is incident at various angles.

In addition to the transmissive configuration, the three-dimensional shape reconstruction (or restoration) method described in the present disclosure may be applied to the reflective configuration depending on the characteristics of the specimen.

The size of the multiple light source array and the distance from the multiple lights to the specimen may determine the final synthetic aperture. Additionally, the size of the multiple light source array and the distance from the multiple lights to the specimen may be designed to obtain a desired level of vertical (lateral) resolution.

The distance between individual light sources may determine how close the curved surfaces of a spherical shell are to each other, given the constraints on the refractive index distribution. The distance between individual light sources may be designed so that constraints may be given at sufficiently close spacing based on prior information about the specimen.

The process of obtaining a specimen image based on a multiple light source array can be performed according to a method described later.

First, the first original video image may be saved by recording the intensity distribution of the image sensor plane with a digital imaging device, etc., with only the first light source in the multi-light source array turned on.

Next, the second original video image may be saved in the same manner as described above, with the previously turned on light source (i.e., the first light source) turned off and only the second light source turned on.

As the above-described process is performed for all individual light sources on the multi-light source array, N original video images may finally be obtained. Individual raw video images may be managed in a way that the corresponding light incident direction may be known.

The process of reconstructing the three-dimensional refractive index distribution from the acquired collection of original video images may be performed according to the method described later.

First, a scattering potential estimation model that expresses/estimates the light scattering characteristics of the specimen may be constructed.

Next, the scattering potential distribution V(x, y, z) for the preset three-dimensional restoration performance area may be estimated using the scattering potential estimation model.

Afterwards, the three-dimensional Fourier spectrum $W(k_x, k_y, k_z)$ values of the scattering potential distribution along the spherical shell surface $(k_x, k_y, f(k_x, k_y, \theta, \varphi))$ corresponding to the illumination incident angle $(\theta, \varphi)$ are picked up and can be projected onto the $k_x k_y$ plane.

At this time, the sphere shell surface may be expressed as Equation 1 below.

$$\left(k_x, k_y, \sqrt{k^2 - k_x^2 - k_y^2}\right) - k\mu(\theta, \varphi) \qquad \text{[Equation 1]}$$

In Equation 1, k means the size of the wavenumber considering the refractive index of the background area surrounding the object to be restored, and $u(\theta, \varphi)$ means the direction vector (cos $\varphi$ si $\theta$, sin $\varphi$ sin $\theta$, cos $\theta$). Additionally, the range of $k_x$ and $k_y$ may be limited by the aperture ratio of the imaging system.

The scattered light distribution may then be obtained by applying a two-dimensional inverse Fourier transform to the projected two-dimensional image. By adding the background light to the obtained scattered light distribution, a collection of acquired image predictions $I_{pred}$ for each illumination incident angle may be obtained. Additionally, a scattering potential estimation model may be learned based on the difference between the predicted image acquired for each illumination incident angle and the actual measured image.

By repeating the above-described process several times, a scattering potential estimation model that matches the actual measurement results may be obtained. Finally, the refractive index distribution may be obtained according to Equation 2.

$$n(x, y, z) = \sqrt{\frac{\lambda^2}{\pi} V(x, y, z) - +n_b^2} \qquad \text{[Equation 2]}$$

In Equation 2, no means the refractive index of the background area, and λ means the center frequency of the illumination light.

Figure 3:
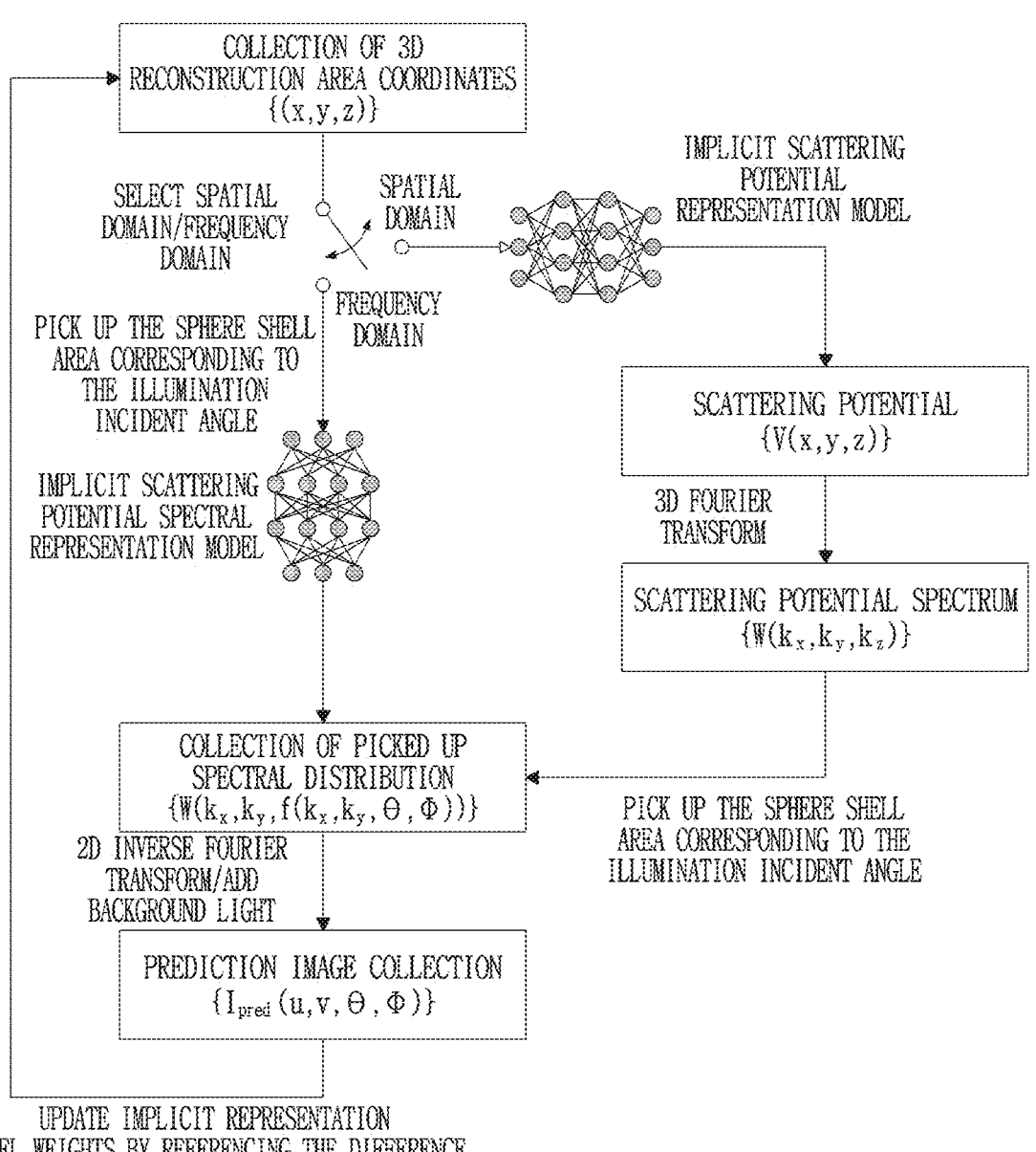
FIG. 3 is a flowchart for describing a method of learning an implicit representation model for scattering potential, according to an embodiment of the present disclosure.

FIG. 3 is a flowchart for describing a method of learning an implicit representation model for scattering potential, according to an embodiment of the present disclosure.

First, the preset 3D reconstruction (or restoration) performance area may be expressed as a discretized 3D grid. Here, the final 3D reconstructed data may be output based on the defined grid.

Next, a domain on which to perform iterative optimization may be selected. In other words, choose whether to perform iterative optimization in the spatial domain or the frequency domain.

As an example, when a spatial domain is selected, grid coordinates may be input into the implicit representation model. Here, the implicit expression model may be learned to output the estimated scattering potential value of the corresponding location based on the input 3D coordinates.

The scattering potential spectrum $\{W(k_x, k_y, k_z)\}$ may be obtained by applying 3D discrete Fourier transform to the scattering potential data $\{V(x, y, z)\}$ obtained through the implicit expression model.

And, a collection of picked up spectral distributions $\{W(k_x, k_y, f(k_x, k_y, \theta, \varphi))\}$ may be obtained by extracting the scattering potential spectrum values along the spherical shell surface defined by Equation 1.

The $k_x$, $k_y$ grid for obtaining the spherical shell surface coordinates may be the same grid as the original image, separately from the 3D grid. When using a different grid from the original image, it may be necessary to align the grid of the predicted image with the grid of the original image, which will be described later.

Since spherical shell surface coordinates generally do not coincide with 3D grid points, interpolation techniques such as nearest neighbor selection or bilinear interpolation may be applied. By performing a 2D Fourier inverse transform on $W_{proj}(k_x, k_y)=W(k_x, k_y, f(k_x, k_y, \theta, \varphi))$, which is a vertical projection of the picked up spectral distribution onto the $k_x k_y$ plane, and then adding background light, a collection of predicted images to be compared with the actual image may be obtained.

The difference between the predicted image and the actual image may be calculated through various image reconstruction loss functions. For example, as defined in Equation 3, the difference between the predicted image and the actual image may be calculated based on the mean square error.

$$L = \sum_{u,v,i} \left| \sqrt{I_{i,measured(u,v)}(u, v)} - \sqrt{I_{i,pred}(u, v)} \right|^2 \qquad \text{[Equation 3]}$$

Here, $I_{i,pred}$ and $I_{i,measured}$ respectively mean the predicted image and the actual measured original image when the I-th light source is turned on.

In addition to the image reconstruction loss term described above, the loss function may additionally include a scattering potential sign regulation term, a scattering potential global variation regulation term, etc.

The process of calculating the loss function from the scattering potential may all be expressed as a function that may be numerically differentiated, and data may be transferred to the implicit scattering potential expression model by backpropagating the gradient from the loss function.

Accordingly, an implicit expression model may be learned using an optimization algorithm corresponding to gradient descent and its variants. The implicit expression model may have a form that can learn internal parameters based on gradient information for the final output. As an example, the implicit expression model may be configured in the form of a multi-layer perceptron.

If frequency domain optimization is chosen instead of spatial domain optimization, the implicit representation model may directly estimate the Fourier spectral value of the scattering potential.

Therefore, instead of estimating the scattering potential distribution over the entire restoration region and then picking up the scattering potential spectrum along the spherical shell surface, a collection of the picked up spectral distributions may be output as the spherical shell surface coordinates are directly input into the implicit representation model.

When the number of sphere shells associated with a sample is smaller than the number of cross-sections along the optical axis (of multiple light sources), frequency domain optimization has advantages in terms of computational effort and may provide more accurate training signals since input coordinate interpolation is not required. Accordingly, a frequency domain-based learning method may be determined.

On the other hand, when constructing an implicit representation model based on a convolutional neural network or a multilayer perceptron, the structural learning bias of the model may better match the spatial domain distribution of the scattering potential rather than the frequency domain distribution. Accordingly, a spatial domain-based learning method may be determined.

Figure 4:
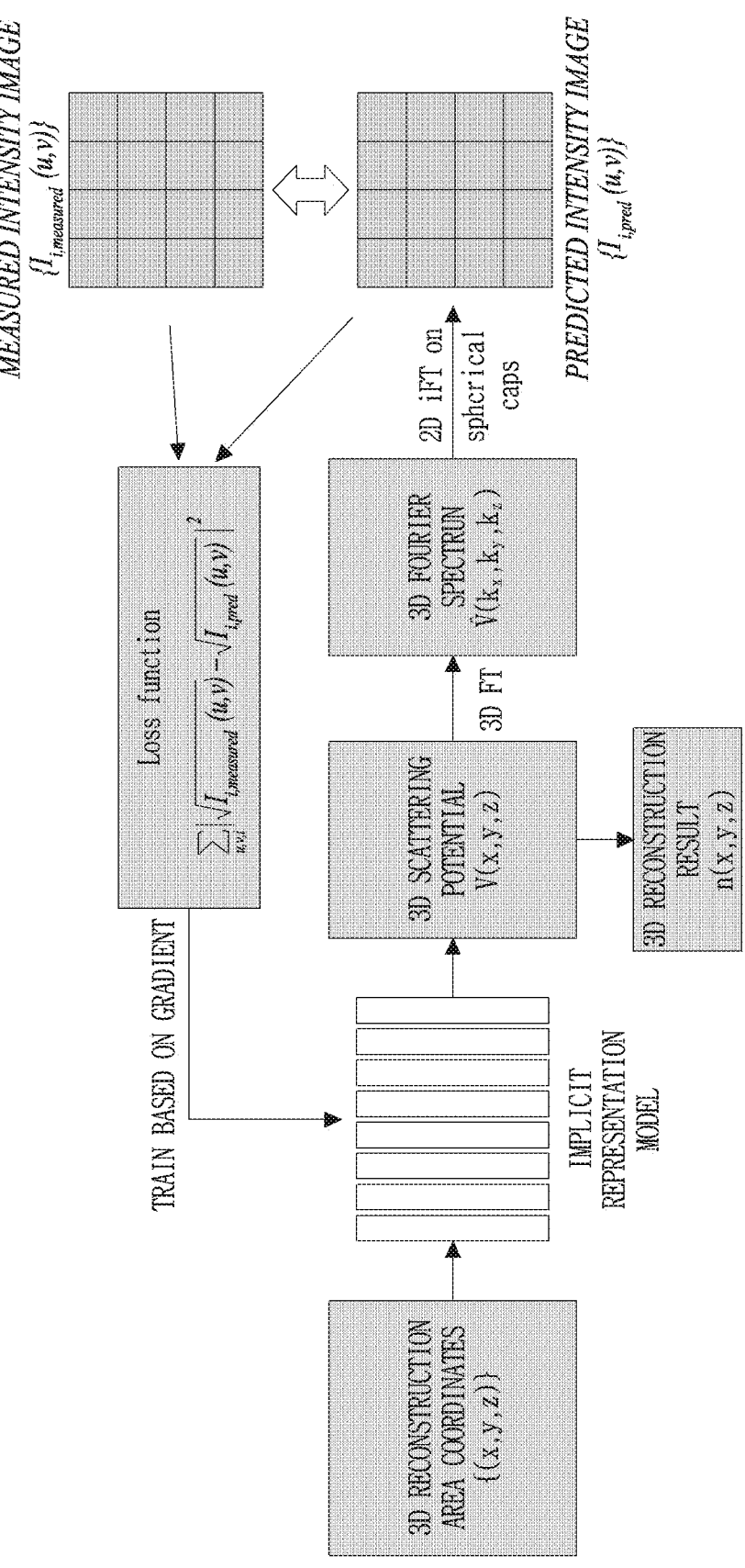

FIGS. 4 and 5 are flowcharts for describing a method of learning an implicit representation model to output a scattering potential, according to an embodiment of the present disclosure.

As shown in FIG. 4, the device may obtain 3D potential data by inputting 3D restored area coordinates into an implicit representation model. However, this is only an example, and the device may obtain a 3D Fourier spectrum by inputting the coordinates of the 3D restored area into an implicit expression model.

Here, when 3D Fourier transform is applied to 3D potential data, a 3D Fourier spectrum can be output.

For example, as shown in FIG. 5, the device may first set an area to be restored/reconstructed to a 3D shape (i.e., 3D restoration area). The device may calculate/acquire the coordinates of a specific grid point within the 3D reconstruction area. The device may perform multi-frequency embedding on calculated/acquired specific grid point coordinates. The device may obtain 3-dimensional potential data by applying an implicit expression model to the multi-frequency embedding value. At this time, the three-dimensional potential data may be divided into a scattering potential real part and a scattering potential imaginary part.

As shown in FIG. 4, the device may obtain a predicted intensity image by applying a two-dimensional inverse Fourier transform to three-dimensional potential data and then adding background light. The device may calculate a loss function based on the difference between the predicted intensity image and the measured intensity image.

The actual intensity image configuration may be formed identical/similar to the configuration of the LED. As an example, assume that a plurality of LEDs included in an LED array are arranged in a checkerboard shape. An actually measured intensity image can be obtained by each of the plurality of LEDs irradiating light to the sample at different angles of incidence. The device may configure intensity images obtained through each of a plurality of LEDs to be similar to a plurality of LED arrays.

The device may learn an implicit expression model based on a loss function using gradient descent. Accordingly, the device may optimize the weights of the learned implicit representation model to output a 3-dimensional potential (or 3-dimensional Fourier spectrum).

Figure 6:
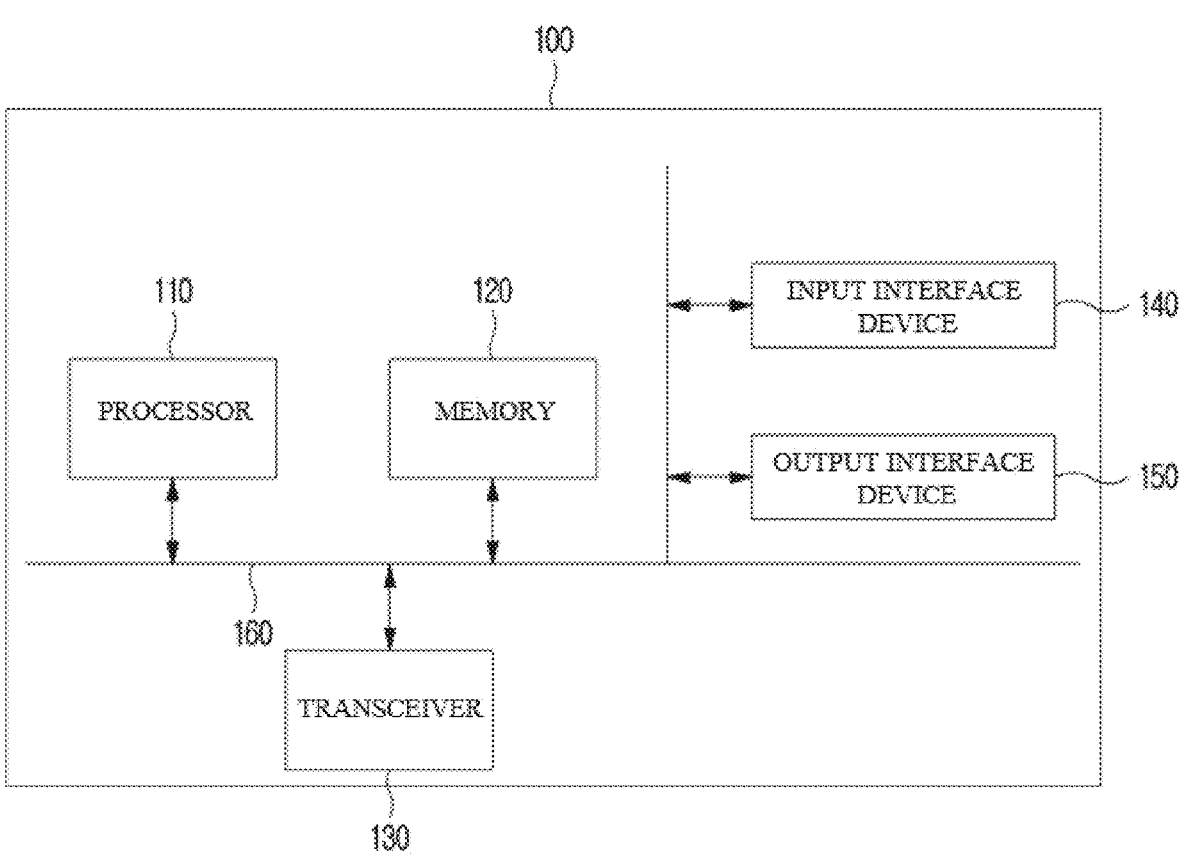
FIG. 6 is a block diagram illustrating a device according to an embodiment of the present disclosure.

FIG. 6 is a block diagram illustrating a device according to an embodiment of the present disclosure.

Referring to FIG. 6, device 100 may represent a device that implements the method for restoring a three-dimensional shape based on multiple light sources described in the present disclosure.

The device 100 may include at least one of a processor 110, a memory 120, a transceiver 130, an input interface device 140, and an output interface device 150. Each component may be connected by a common bus 160 and may communicate with each other. Additionally, each component may be connected through an individual interface or individual bus centered on the processor 110, rather than through the common bus 160.

The processor 110 may be implemented in various types such as an Application Processor (AP), Central Processing Unit (CPU), Graphic Processing Unit (GPU), etc. and may be any semiconductor device that executes instructions stored in the memory 120. The processor 110 may execute program commands stored in the memory 120. The processor 110 may be set to perform the method of restoring/reconstructing a three-dimensional shape based on the multiple light sources described above with reference to FIGS. 1 to 5.

The processor 110 may include one or more modules for performing a method of reconstructing/restoring a three-dimensional shape based on multiple light sources.

Additionally or alternatively, the processor 110 may store program instructions for implementing at least one function for one or more modules in the memory 120 and control the operations described based on FIGS. 1 to 5 to be performed. That is, each operation and/or function according to FIGS. 1 to 5 may be executed by one or more processors 110.

Memory 120 may include various types of volatile or non-volatile storage media. For example, the memory 120 may include read-only memory (ROM) and random access memory (RAM). In an embodiment of the present disclosure, the memory 120 may be located inside or outside the processor 110, and the memory 120 may be connected to the processor 110 through various known means.

For example, the memory 120 may store coordinates corresponding to a specific 3D reconstruction area, training data for training an AI model, and data related to 3D scattering potential.

The transmitting and receiving unit 130 may perform a function of transmitting and receiving data processed/to be processed by the processor 110 with an external device and/or an external system.

For example, the transmitting and receiving unit 130 may be used to exchange data (e.g., actual image data) with another terminal device (e.g., a microscope device).

The input interface device 140 is configured to provide data to the processor 110.

The output interface device 150 is configured to output data from the processor 110.

Components described in example embodiments of the present disclosure may be implemented by hardware elements. for example, the hardware element may include at least one of a digital signal processor (DSP), a processor, a controller, an application specific integrated circuit (ASIC), a programmable logic element such as an FPGA, a GPU, other electronic devices, or a combination thereof. At least some of the functions or processes described in the exemplary embodiments of the present disclosure may be implemented as software, and the software may be recorded on a recording medium. Components, functions, and processes described in example embodiments may be implemented in a combination of hardware and software.

The method according to an embodiment of the present disclosure may be implemented as a program that may be executed by a computer, and the computer program may be recorded in various recording media such as magnetic storage media, optical read media, and digital storage media.

Various techniques described in the present disclosure may be implemented as digital electronic circuits or computer hardware, firmware, software, or combinations thereof. The above techniques may be implemented as a computer program product, that is, a computer program or computer program tangibly embodied in an information medium (e.g., machine-readable storage devices (e.g., computer-readable media) or data processing devices), a computer program implemented as a signal processed by a data processing device or propagated to operate a data processing device (e.g., a programmable processor, computer or multiple computers).

Computer program(s) may be written in any form of programming language, including compiled or interpreted languages. It may be distributed in any form, including stand-alone programs or modules, components, subroutines, or other units suitable for use in a computing environment. A computer program may be executed by a single computer or by a plurality of computers distributed at one or several sites and interconnected by a communication network.

Examples of information medium suitable for embodying computer program instructions and data may include semiconductor memory devices (e.g., magnetic media such as hard disks, floppy disks, and magnetic tapes), optical media such as compact disk read-only memory (CD-ROM), digital video disks (DVD), etc., magneto-optical media such as floptical disks, and ROM (Read Only Memory), RAM (Random Access Memory), flash memory, EPROM (Erasable Programmable ROM), EEPROM (Electrically Erasable Programmable ROM) and other known computer readable media. The processor and memory may be complemented or integrated by special purpose logic circuitry.

A processor may execute an operating system (OS) and one or more software applications running on the OS. The processor device may also access, store, manipulate, process and generate data in response to software execution. For simplicity, the processor device is described in the singular number, but those skilled in the art may understand that the processor device may include a plurality of processing elements and/or various types of processing elements. For example, a processor device may include a plurality of processors or a processor and a controller. Also, different processing structures may be configured, such as parallel processors. In addition, a computer-readable medium means any medium that can be accessed by a computer, and may include both a computer storage medium and a transmission medium.

Although the present disclosure includes detailed descriptions of various detailed implementation examples, it should be understood that the details describe features of specific exemplary embodiments, and are not intended to limit the scope of the invention or claims proposed in the present disclosure.

Features individually described in exemplary embodiments in the present disclosure may be implemented by a single exemplary embodiment. Conversely, various features that are described for a single exemplary embodiment in the present disclosure may also be implemented by a combination or appropriate sub-combination of multiple exemplary embodiments. Further, in the present disclosure, the features may operate in particular combinations, and may be described as if initially the combination were claimed. In some cases, one or more features may be excluded from a claimed combination, or a claimed combination may be modified in a sub-combination or modification of a sub-combination.

Similarly, although operations are described in a particular order in a drawing, it should not be understood that it is necessary to perform the operations in a particular order or order, or that all operations are required to be performed in order to obtain a desired result. Multitasking and parallel processing can be useful in certain cases. In addition, it should not be understood that various device components must be separated in all exemplary embodiments of the embodiments, and the above-described program components and devices may be packaged into a single software product or multiple software products.

Exemplary embodiments disclosed herein are illustrative only and are not intended to limit the scope of the disclosure. Those skilled in the art will recognize that various modifications may be made to the exemplary embodiments without departing from the spirit and scope of the claims and their equivalents.

Accordingly, it is intended that the present disclosure include all other substitutions, modifications and variations falling within the scope of the following claims.

What is claimed is:

1. A method performed by a device to reconstruct a three-dimensional (3D) shape based on multiple light sources, the method includes:

obtaining a set of measured images of a specimen by photographing the specimen under different lighting conditions;

defining a first three-dimensional grid within a 3D reconstruction area including all or part of the specimen;

obtaining a first set of coordinate values for calculating a scattering potential value within a first 3D grid or a frequency grid region corresponding to the first 3D grid;

inputting the first set of coordinate values into an artificial neural network model to obtain an inference result related to a scattered potential;

obtaining a set of predicted images corresponding to the different lighting conditions based on the inference result related to the scattering potential;

training the artificial neural network model based on differences between the set of predicted images and the set of the measured images;

obtaining a second set of coordinate values including at least one coordinate of a second 3D grid in an area for performing final 3D reconstruction;

inputting the second set of coordinate values into the artificial neural network model to obtain output data related to scattering potential; and obtaining a 3D refractive index distribution of the specimen based on the output data, wherein a domain type related to the artificial neutral network model is determined based on a scattering characteristic of a sample corresponding to the set of measured images, wherein based on a domain type being determined to be a spatial domain: the inference result includes scattering potential data, and the set of predicted images is obtained based on scattering potential spectrum data obtained from the scattering potential data, and wherein based on the domain type being determined to be a frequency domain: the inference result includes the scattering potential spectrum data, and the set of predicted images is obtained based on the scattering potential spectrum data.

2. The method of claim 1, wherein:

the multiple light sources include a plurality of light emitting diodes (LEDs) configuring the different lighting conditions, the set of measured images is obtained through light emitted through each of the plurality of LEDs, and an angle of incidence of the each of the plurality of LEDs is different from each other.

3. The method of claim 1, wherein:

the training the artificial neural network model includes updating a weight of the artificial neural network model through gradient descent using a loss function calculated based on difference between the set of predicted images and the set of measured images.

4. A device that reconstructs 3-dimensional (3D) shape based on multiple light sources, the device comprising:

at least one memory; and at least one processor, wherein the at least one processor is configured to:

obtain a set of measured images of a specimen by photographing the specimen under different lighting conditions;

define a first three-dimensional grid within a 3D reconstruction area including all or part of the specimen;

obtain a first set of coordinate values for calculating a scattering potential value within a first 3D grid or a frequency grid region corresponding to the first 3D grid;

input the first set of coordinate values into an artificial neural network model to obtain an inference result related to a scattered potential;

obtain a set of predicted images corresponding to the different lighting conditions based on the inference result related to the scattering potential;

train the artificial neural network model based on differences between the set of predicted images and the set of the measured images;

obtain a second set of coordinate values including at least one coordinate of a second 3D grid in an area for performing final 3D reconstruction;

input the second set of coordinate values into the artificial neural network model to obtain output data related to scattering potential; and obtain a 3D refractive index distribution of the specimen based on the output data, wherein a domain type related to the artificial neutral network model is determined based on a scattering characteristic of a sample corresponding to the set of measured images, wherein based on a domain type being determined to be a spatial domain: the inference result includes scattering potential data, and the set of predicted images is obtained based on scattering potential spectrum data obtained from the scattering potential data, and wherein based on the domain type being determined to be a frequency domain: the inference result includes the scattering potential spectrum data, and the set of predicted images is obtained based on the scattering potential spectrum data.

5. The device of claim 4, wherein:

the multiple light sources include a plurality of light emitting diodes (LEDs) configuring the different lighting conditions, the set of measured images is obtained through light emitted through each of the plurality of LEDs, and an angle of incidence of the each of the plurality of LEDs is different from each other.

6. The device of claim 4, wherein the at least one processor is configured to update a weight of the artificial neural network model through gradient descent using a loss function calculated based on difference between the set of predicted images and the set of measured images.

7. A system for reconstructing a 3-dimensional (3D) shape, the system comprising:

a device for restoring 3D shape; and multiple light source system that obtains measured image data through multiple light sources;

the device is configured to:

obtain a set of measured images of a specimen by photographing the specimen under different lighting conditions;

define a first three-dimensional grid within a 3D reconstruction area including all or part of the specimen;

obtain a first set of coordinate values for calculating a scattering potential value within a first 3D grid or a frequency grid region corresponding to the first 3D grid;

input the first set of coordinate values into an artificial neural network model to obtain an inference result related to a scattered potential;

obtain a set of predicted images corresponding to the different lighting conditions based on the inference result related to the scattering potential;

train the artificial neural network model based on differences between the set of predicted images and the set of the measured images;

obtain a second set of coordinate values including at least one coordinate of a second 3D grid in an area for performing final 3D reconstruction;

input the second set of coordinate values into the artificial neural network model to obtain output data related to scattering potential; and obtain a 3D refractive index distribution of the specimen based on the output data, wherein a domain type related to the artificial neutral network model is determined based on a scattering characteristic of a sample corresponding to the set of measured images, wherein based on a domain type being determined to be a spatial domain: the inference result includes scattering potential data, and the set of predicted images is obtained based on scattering potential spectrum data obtained from the scattering potential data, and wherein based on the domain type being determined to be a frequency domain: the inference result includes the scattering potential spectrum data, and the set of predicted images is obtained based on the scattering potential spectrum data.

\* \* \* \* \*